June 23, 1953 G. F. SLEEGER 2,643,371
SIGNAL INDICATOR FOR FISHING LINES
Filed Aug. 12, 1948
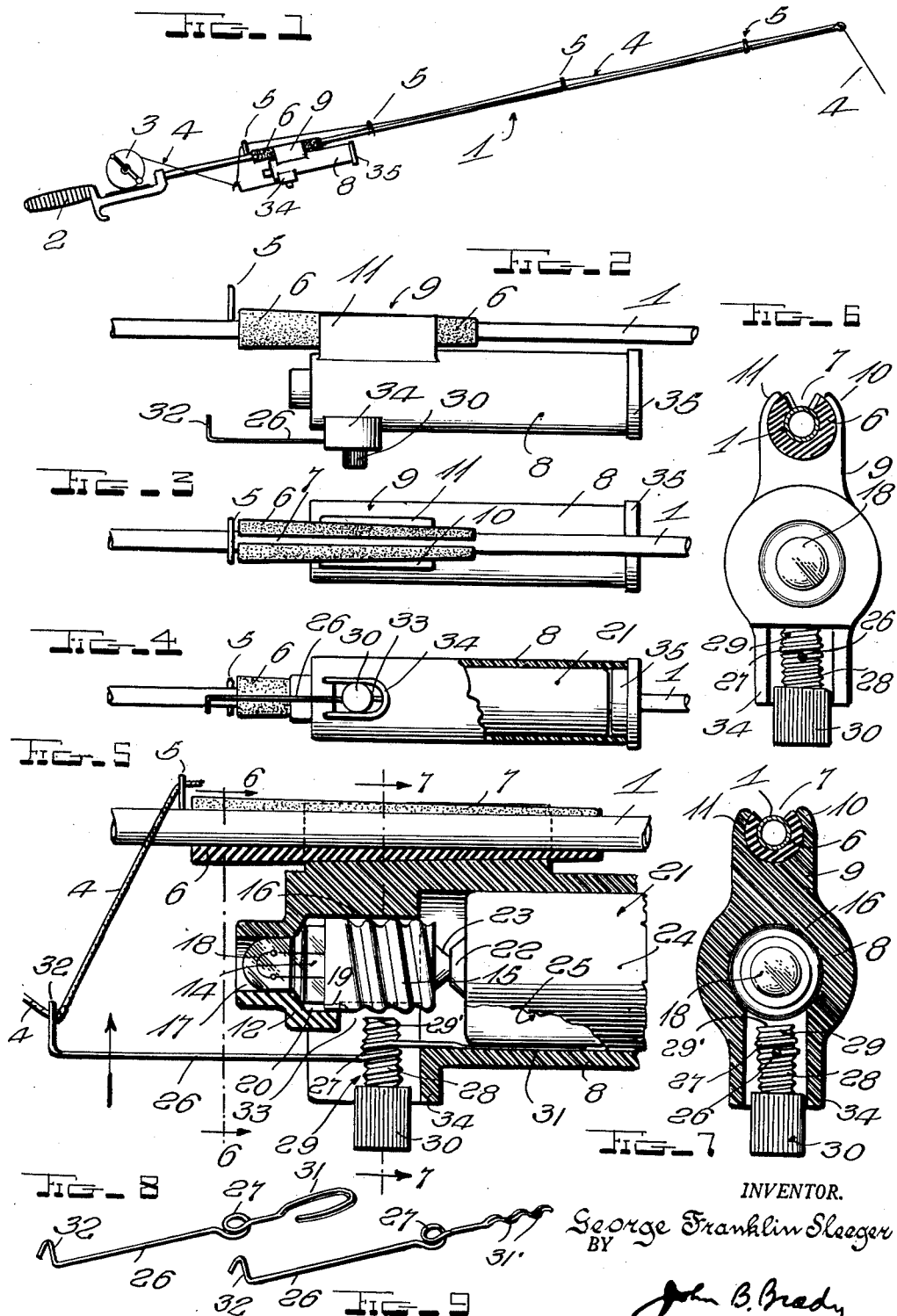
INVENTOR.
George Franklin Sleeger
BY
John B. Brady
ATTORNEY Patented June 23, 1953

2,643,371

UNITED STATES PATENT OFFICE 2,643,371

SIGNAL INDICATOR FOR FISHING LINES

George Franklin Sleeger, York, Pa.

Application August 12, 1948, Serial No. 43,863

3 Claims. (Cl. 340—261)

My invention relates broadly to fishing equipment, and more particularly to a signal attachment for fishing rods.

One of the objects of my invention is to provide a simplified construction of attachment for fishing rods to provide a visual signal in the event of a pull on the fishing rod for indicating a bite or strike.

Another object of my invention is to provide a self-contained miniature battery holder and incandescent light and adjustable switch device which may be readily attached to the conventional fishing rod and connected with the fishing line for actuation under control of a pull on the fishing line for visually indicating a bite or strike.

Still another object of my invention is to provide a simplified assembly for an adjustable switch device and a battery within a plastic casing readily attachable to a conventional fishing rod and engageable with the fishing line so that a pull on the fishing line serves to actuate the switching device for energizing the incandescent light.

Still another object of my invention is to provide an arrangement of plastic case carrier for a battery, incandescent light and adjustable switching device for signaling devices for fishing rods in which the carrier may be readily attached by a wedging action over a tapered and slotted grommet attachable over one side of the fishing rod.

Other and further objects of my invention reside in the construction of a self-contained signal indicator and the attachment means for connecting the indicator to a fishing rod, as set forth more fully in the specification hereinafter following by reference to the accompanying drawings, in which:

Figure 1 illustrates the application of the signal indicator of my invention to a fishing rod; Fig. 2 is a side elevational view of the signal indicator of my invention applied to a fishing rod, the view being taken on an enlarged scale and illustrating a fragmentary portion of the fishing rod; Fig. 3 is a top plan view of the signal indicator and shows the manner of attachment thereof to the fishing rod; Fig. 4 is a bottom plan view of the signal indicator attached to a fishing rod, the casing of the signal indicator being partially broken away and illustrated in section for showing the dry cell battery in position within the casing; Fig. 5 is an enlarged vertical sectional view through the switch control structure and the attachment means for the signal indicator in position upon the fishing rod; Fig. 6 is a transverse sectional view taken substantially on line 6—6 of Fig. 5; Fig. 7 is a transverse sectional view taken substantially on line 7—7 of Fig. 5; Fig. 8 is a perspective view of one form of spring actuator employed in the structure of my invention; and Fig. 9 is a perspective view of a modified form of spring actuator which may be employed in the structure of my invention.

Referring to the drawings in detail, reference character 1 designates a conventional fishing rod having handle 2 and reel 3 and equipped with fishing line 4. The fishing rod has a conventional arrangement of eyelet fishing line guides which I have represented at 5 disposed at spaced intervals along the rod for guiding the fishing line 4.

Immediately adjacent one of the eyelet guides 5 near the handle portion of the fishing rod I provide a tapered resilient grommet 6 which is split longitudinally thereof as represented at 7 to facilitate the spreading of the grommet and the attachment thereof around the fishing rod 1. The grommet 6 is in the nature of a bifurcated member which fits around and embraces the fishing rod 1 and provides a pliable base for the attachment of the signal indicator casing 8.

The signal indicator casing 8 is provided with an offset projection 9 adjacent one end thereof as shown in Figs. 1–3 and Figs. 5–7, terminating in a pair of interiorly curved jaws 10 and 11. The jaws 10 and 11 are interiorly tapered and rounded and substantially conform in section to the tapered grommet 6. Thus, the tapered jaws 10 and 11 are formed complementary with respect to the tapered grommet 6 and effect a wedging action therewith as the signal indicator casing 8 is forced longitudinally with respect to the fishing rod 1. The open gap between jaws 10 and 11 is selected of such size that the jaws will readily pass over the diameter of the fishing rod and permit the jaws to be moved longitudinally with respect to the grommet 6 for clamping the resilient material of the grommet 6 between the jaws 10 and 11 of the fishing rod 1. For this reason the attachment is clamped in position along the fishing rod 1 where adequate longitudinal movement of the casing 8 may be effected in performing a clamping operation without interference with any one of the positions occupied by eyelet guides 5. The bifurcated jaws 10 and 11 are inwardly tapered from a relatively wide dimension adjacent the handle end of the fishing rod to a relatively narrower dimension in the direction of the other end of the fishing rod.

The jaws 10 and 11 are formed on the projection 9 adjacent one end of the substantially cylindrical casing 8. This same end of the casing 8 is interiorly formed to provide a mounting means 12 for an incandescent lamp 14. The incandescent lamp 14 is of the conventional screw base type as represented at 15, the screw base fitting within the cylindrical portion 16 of the end of the casing 8 with the incandescent light 14 projecting interiorly of the open cylindrical sleeve like end 17 of the casing 8. The incandescent lamp includes a light magnifier end 18 through which a bright pencil of light rays is visible from beneath the open end 17 of the casing 8 when the incandescent lamp is energized.

To ensure the proper assembly of the incandescent lamp within the mounting means 12, I insert the incandescent lamp in such a position that the solder terminal 19 at one side of the screw base 15 thereof enters the keyway 20 provided in the mounting means 12. Thus, the incandescent lamp is firmly maintained in position within the mounting means 12 preparatory to the insertion of the dry cell battery 21. The dry cell battery 21 has a central carbon electrode terminal 22 which registers with the central contact 23 on the base of the incandescent lamp. The insulation wrapper 24 on battery 21 is torn away at 25 exposing the zinc cylindrical battery electrode which establishes frictional wedging contact with the spring resilient wire member shown at 26. The resilient wire member 26 may have a variety of forms. Figs. 8 and 9 show typical forms of this resilient wire member. In the form illustrated in Fig. 8, resilient wire member 26 has a relatively central coiled portion 27 in which the convolutions are wrapped upon themselves at spaced intervals to accommodate the pitch of the thread 28 of the adjusting screw 29 having knurled manually adjustable portion 30. The screw 29 may be advanced or retracted through the convolutions 27 formed in resilient wire member 26 in the nature of a threaded recess in resilient wire member 26 in order to provide for the adjusting of the contact gap between the end of the screw 29 and the screw threaded base 15 of the incandescent lamp.

One end of the resilient wire member 26 is flattened and looped upon itself as represented at 31 and fits between the interior wall of the casing 8 and the bare zinc electrode casing 25 of the dry cell battery 24. This wedging connection between the interior wall of the casing 8 and the zinc electrode casing 25 of the dry cell battery 24 serves both to support the resilient wire member 26 and establish electrical connection with the zinc electrode 25 of the dry cell battery 24, as represented in Fig. 5. The loop 31 by reason of its flat construction ensures the proper position of the resilient wire member 26 in the proper plane and precludes the twisting thereof out of the proper position for connection of the fishing line 4 with the hook shaped end 32 of the resilient wire member 26 and the presentation of the contact screw 29 in the proper abutting position with respect to the screw-threaded base 15 of the incandescent lamp 14.

In lieu of the structure illustrated in Fig. 8, I may employ the structure shown in Fig. 9 where the end of the resilient wire member 26 is serpentine in contour, as represented at 31', and is flattened to provide the same wedging action between the zinc electrode 25 and the interior wall of the casing 8.

The side of the casing 8 is apertured, as represented at 33, immediately adjacent the position occupied by the screw-threaded sleeve 15 and the incandescent lamp 14. The aperture portion 33 has a wall 34 projecting outwardly adjacent thereto forming a protecting housing through which the manually adjustable knurled head 30 of adjusting screw 29 is accessible. The aperture 33 is substantially closed by the knurled head 30 of the adjusting screw. The resilient wire member 26 extends in spaced offset planes on opposite sides of the adjusting screw 29 as determined by the pitch of the threads on the adjusting screw and which permits one end of the resilient wire member 26 to be wedged in a position between the interior wall of casing 8 and the electrode 25 of battery 24 while the other end of resilient wire member 26 having the hook shaped portion 32 thereon is free to be yieldably displaced toward and away from the metallic shell 15 of incandescent lamp 14.

In the assembly of the signal indicator on the fishing rod the fishing line 4 extends through eyelet 5 and then through hook shaped end 32 of resilient wire member 26 in the course of its passage to reel 3. The pull on fishing line 4 resulting from a bite or strike results in displacement of resilient wire member 26 toward the fishing rod 1 carrying with it the adjusting screw 29. Adjusting screw 29 is set in desired position by rotation of knurled knob 30 to advance or retract screw threads 28 within the convolutions 27 of resilient wire member 26 for controlling the spacial relation of the contact end 29' of the adjusting screw with respect to the metallic shell 15 of the incandescent lamp 14. Thus, the fisherman can control the displacement required for completing an electrical circuit between the contact end 29' of adjusting screw 29 and metallic shell 15 of incandescent lamp 14. Mere nibbles or slight tugs on the fishing line 4, to which the fisherman's attention should not be called, thus are inadequate to effect a circuit closing operation, but a pull or strike results in the positive displacement of resilient wire member 26 and the movement of the contact end 29' of the adjusting screw 29 into electrical connection with the screw-threaded shell 15 of incandescent lamp 14 closing the electrical circuit from the dry cell battery 24 through the incandescent lamp 14. The lamp is illuminated, rendering light rays visible beneath the casing 8 and indicating to the fisherman the pull or strike on the line.

The casing 8 is readily molded from plastic material and is very compact in construction. The plastic material constitutes an insulation container within which all parts of the device are mounted and are protected from short circuit and the entry of water therein. The open end of the casing 8 may be plugged by cap member 35 for closing the casing with the dry cell battery 24 therein. Batteries may be renewed from time to time by uncapping the casing 8, removing the consumed battery and inserting a fresh battery. The assembly process is extremely simple, as a minimum number of parts is required. Starting with open casing 8 the casing 8 may be held in a vertical inverted position and the incandescent lamp 14 dropped downwardly in position into the open tubular casing in a position in which the solder lug 19 is keyed in the keyway 20 in the lamp supporting portion 12 as indicated in Fig. 5. The resilient wire member 26 is then slipped longitudinally through the opening 33 in the casing to a position in which the flat loop end 31 rests against the interior wall of the casing 8 with the contact end 29' of adjustable screw 29 aligned with screw-threaded shell 15 of incandescent lamp 14. The dry cell battery 24 is then dropped into position with the bared portion 25 of the zinc electrode thereof establishing wedging connection with the flat loop end 31 of resilient wire member 26 and with the carbon electrode 22 thereof establishing contact with the central contact 23 of the incandescent lamp 14. Thus the resilient wire member 26 is secured mechanically in position and is maintained electrically in circuit with the dry cell battery 24 ready to effect a circuit closing operation upon displacement of the hook shaped end 32 thereof under conditions of a pull or strike on the fishing line 4 in engagement with the hook shaped end 32. The flat end of the resilient wire member 26 shown in two different forms at 31 in Fig. 8 and at 31' in Fig. 9. In Fig. 8 the flat end of the resilient wire member 26 has a substantially U-shaped portion bent upon itself and at 31' in Fig. 9 the flat end of the resilient wire member 26 has a serpentine portion for performing the function of maintaining the screw-threaded end 29 of the adjusting screw in a position in which it is aligned with the metallic base of incandescent lamp 14, so that positive electrical contact is assured for any of the several adjustments provided by the projection and retraction of the adjusting screw through the screw-threaded guide 27 constituted by the loops in the resilient wire member 26 intermediate the ends thereof.

I have found the construction of my invention highly practical in manufacture and production and operation, and while I have described my invention in one of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A visual signal comprising a casing substantially conforming in contour with the contour of a dry cell battery and attachable to a support, a resilient wire member having a hook on one end and a flattened portion on the other end, a looped portion intermediate said ends forming a screw-threaded guide, an adjusting screw engaged in the said screw-threaded guide, a dry cell battery removably mounted in said casing and having an exposed external electrode adapted to form wedging connection with the flattened end of said resilient wire member for clamping said resilient wire member between the interior wall of said casing and said dry cell battery in a position normally biased away from said support, an incandescent lamp having one terminal terminating in a sleeve member and the other terminal terminating in a contact member and mounted in the end of said casing said lamp being visible through the end of said casing with one contact member of said lamp establishing continuous contact with one electrode of said dry cell battery, said casing being apertured on one wall thereof immediately adjacent the sleeve member of said lamp for the passage of said adjusting screw therethrough for establishing make and break connection with the sleeve member of said lamp when the hook end of said resilient wire member is displaced toward said support by a pull and/or a slackening of pull on said resilient wire member.

2. A visual signal as set forth in claim 1 in which the flattened portion of said resilient wire member is serpentine in shape and maintains said resilient wire member in a position in which said adjusting screw is presented in a path directed toward the sleeve member of said incandescent lamp for establishing electrical contact with the side of said sleeve member.

3. A signal device comprising a tubular casing formed from insulation material substantially conforming in contour with the contour of a linearly extending dry cell battery and open at one end and terminating in a signal support at the other end, said casing being attachable at one side to a coacting support, a resilient wire member having one end thereof bent upon itself forming a flat U-shaped portion and having the other end thereof formed into a hook extending in a plane substantially normal to the plane of said U-shaped portion, said resilient wire member being formed into a coil intermediate said ends and providing a screw threaded guide on an axis substantially normal to the axis of said resilient wire member and normal to the plane of said U-shaped portion, an adjusting screw engaged in said screw threaded guide, a linearly extending dry cell battery removably mounted in said tubular casing and having an exposed external electrode and a central contact, said external electrode forming a wedging connection with the U-shaped portion of said resilient wire member for clamping the U-shaped portion of said resilient wire member between the interior wall of said casing and the exposed external electrode of said dry cell battery, a signal device having one terminal terminating in a sleeve member and the other terminal terminating in a contact member and mounted in the end of said casing with the said contact member establishing continuous connection with the central contact of said dry cell battery, said casing being apertured in one wall thereof immediately adjacent said sleeve member of said signal device for the passage of said adjusting screw therethrough for establishing make and break connection with said sleeve member of said signal device when the hook end of said resilient wire member is displaced toward and away from said coacting support by a pull or slackening on said hook member at the end of said resilient wire member.

GEORGE FRANKLIN SLEEGER.

References Cited in the file of this patent

UNITED STATES PATENTS

| Number | Name | Date |
|--------|------|------|
| 963,654 | Schindler | July 5, 1910 |
| 1,309,365 | Monighan | July 8, 1919 |
| 1,996,389 | Smith | Apr. 2, 1935 |
| 2,104,888 | Spahr | Jan. 11, 1938 |
| 2,354,279 | Ross | July 25, 1944 |
| 2,409,988 | Schwebs | Oct. 22, 1946 |
| 2,446,427 | Linder | Aug. 3, 1948 |
| 2,530,050 | Evans | Nov. 14, 1950 |